Sept. 28, 1937. E. G. STAUDE 2,094,383
AUTOMATIC CONTROL FOR POWER PROPELLED VEHICLES
Filed March 11, 1932 5 Sheets-Sheet 2
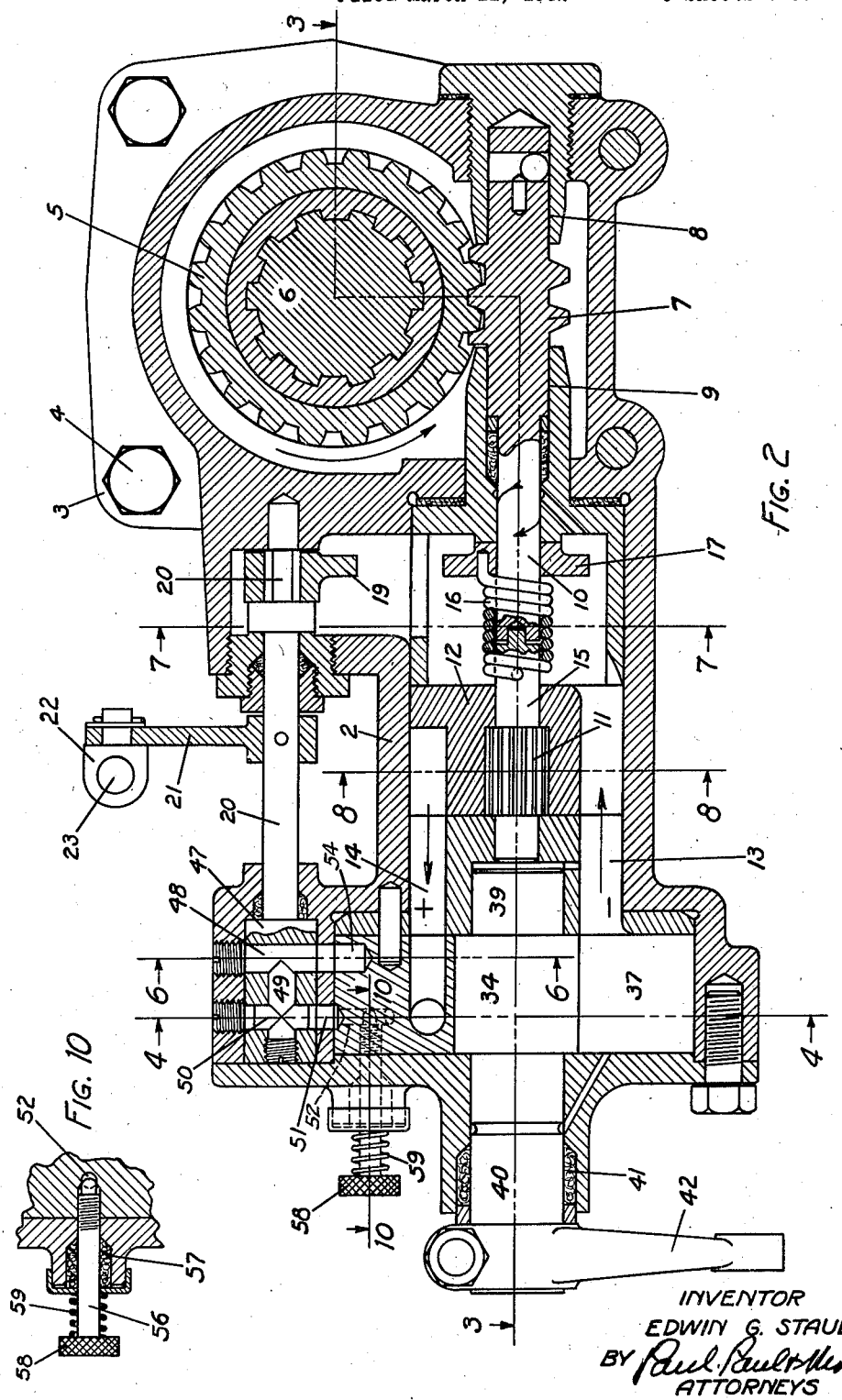
INVENTOR
EDWIN G. STAUDE
BY Paul Paul Moore
ATTORNEYS

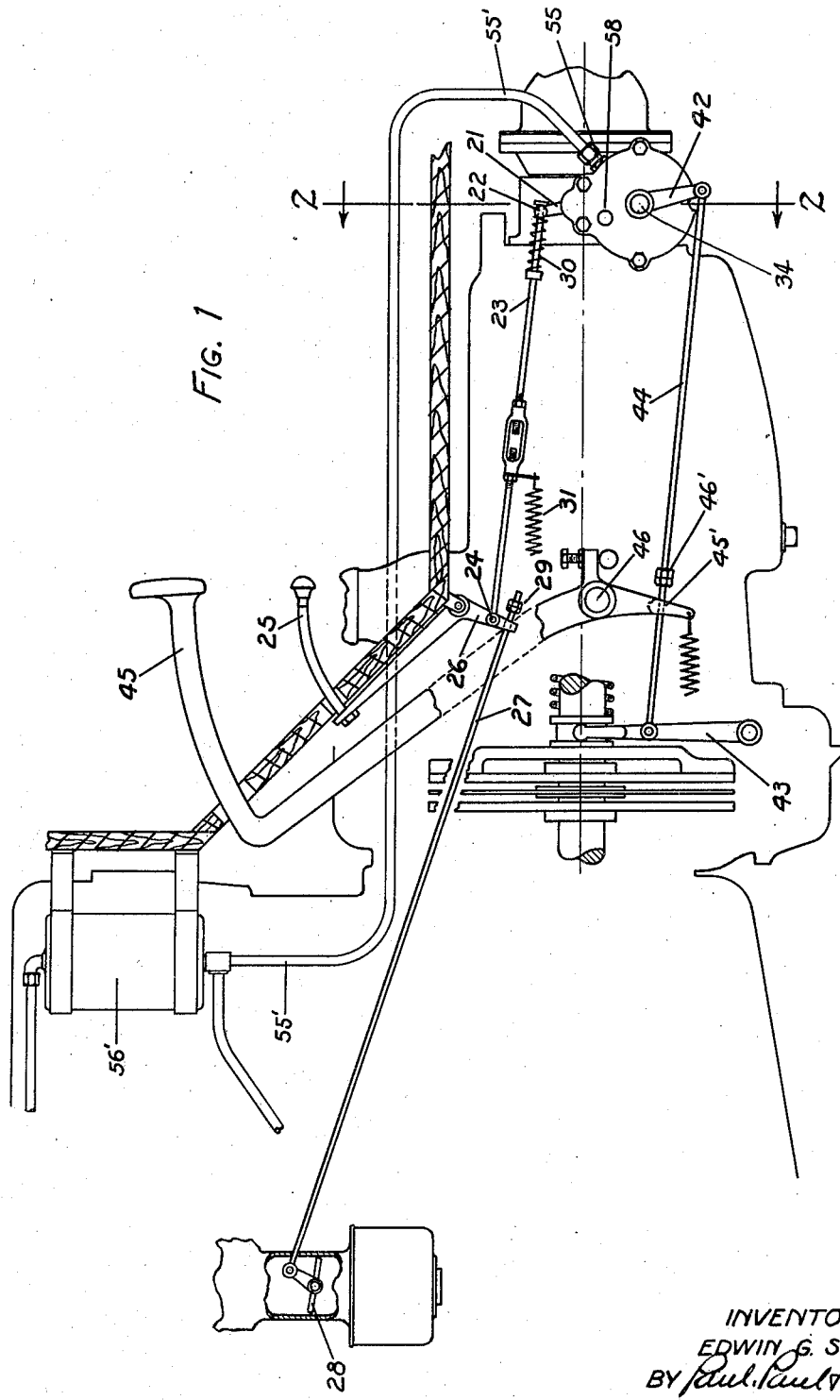

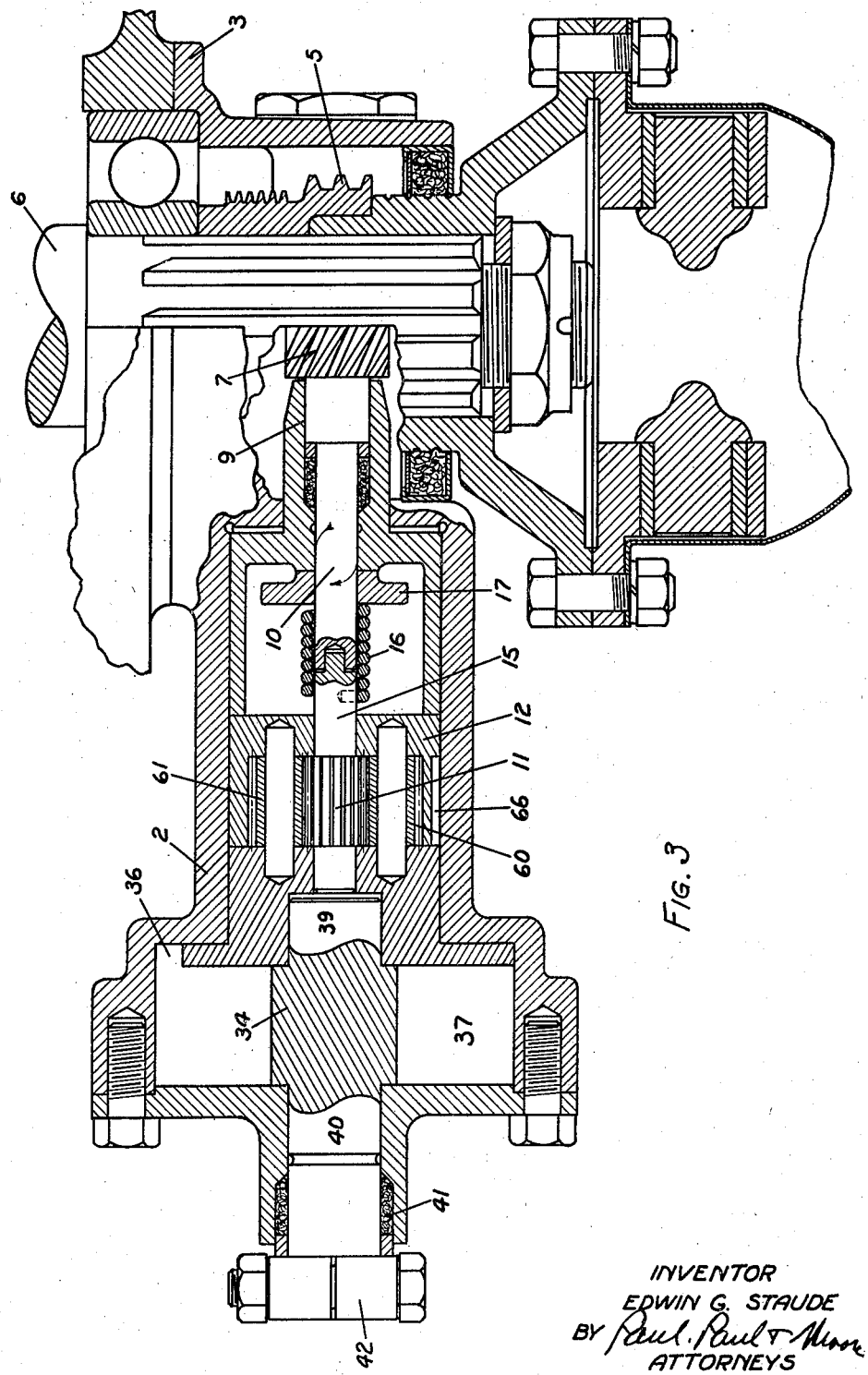

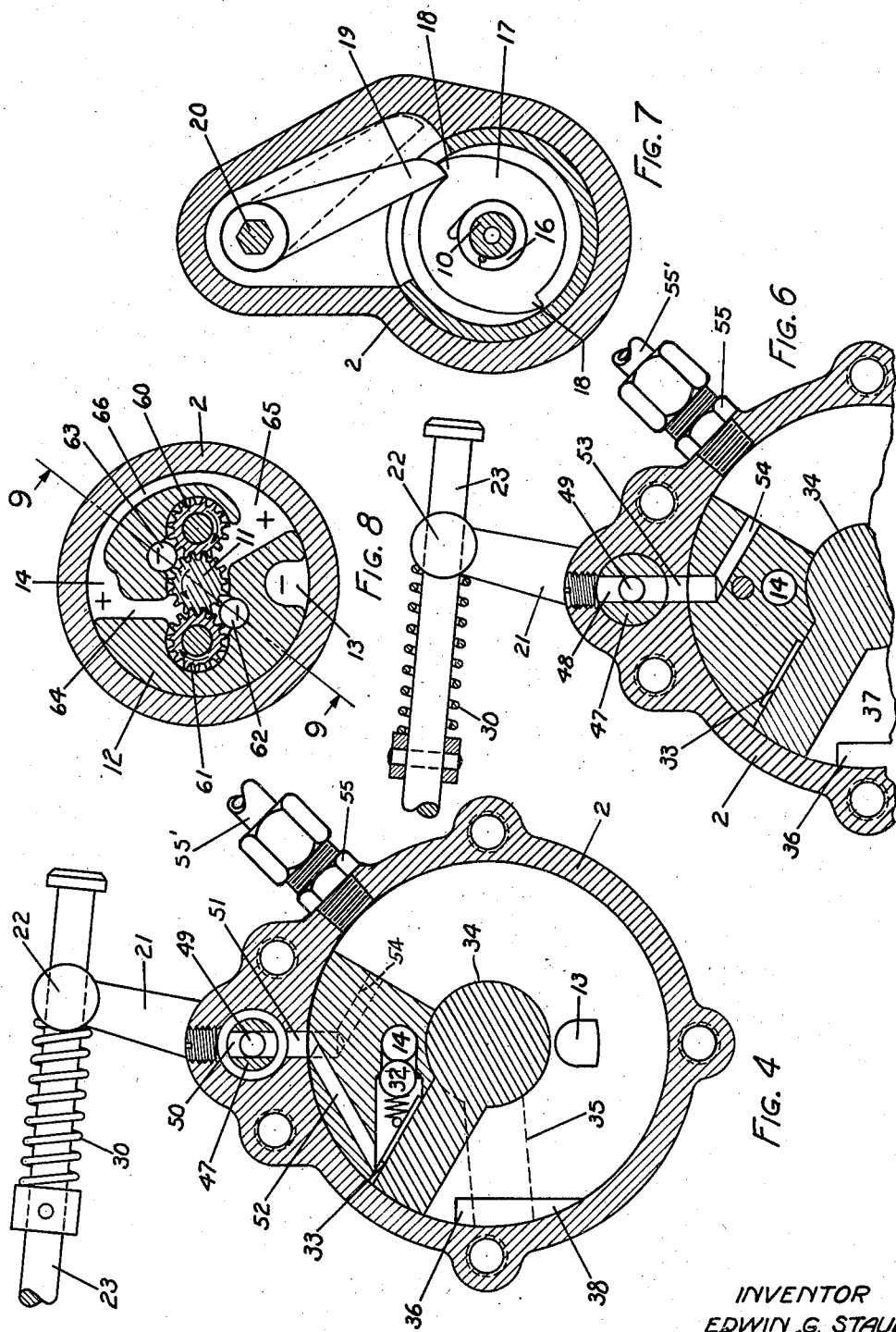

Sept. 28, 1937.  E. G. STAUDE  2,094,383
AUTOMATIC CONTROL FOR POWER PROPELLED VEHICLES
Filed March 11, 1932   5 Sheets-Sheet 5
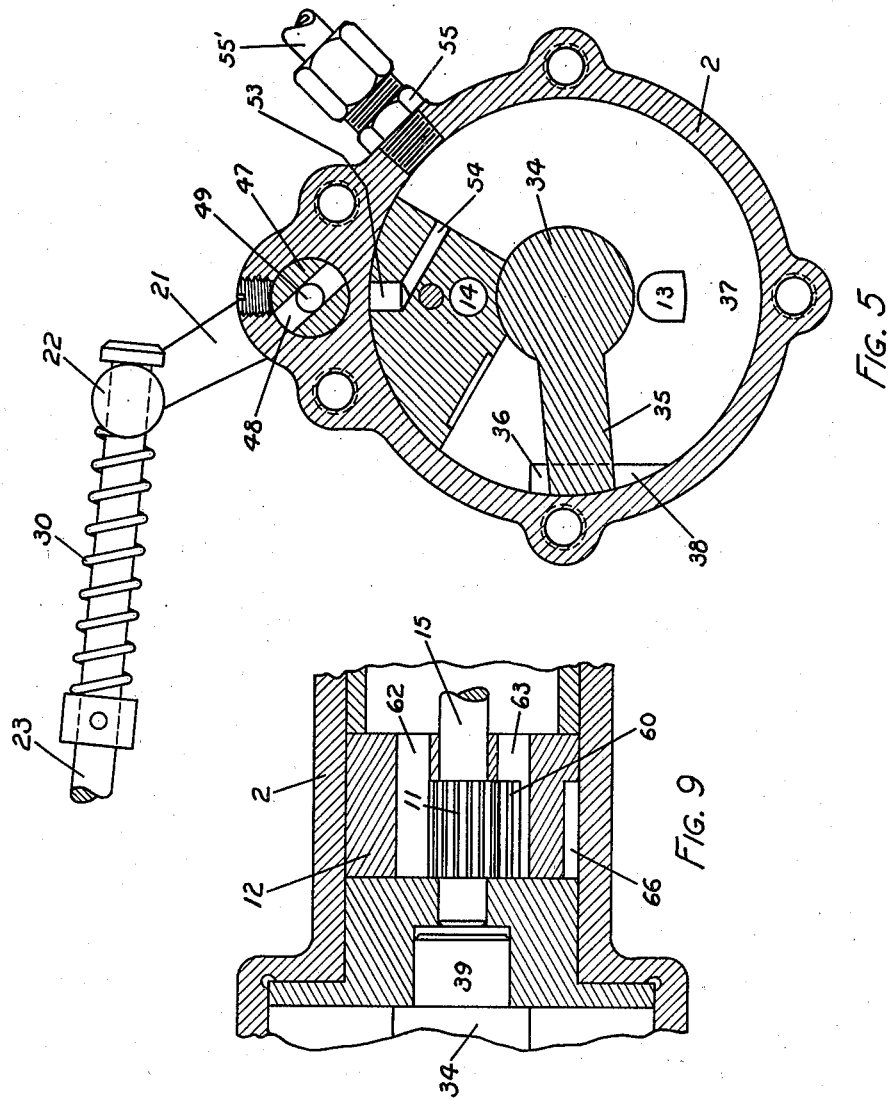
INVENTOR
EDWIN G. STAUDE
BY Paul, Paul & Moore
ATTORNEYS Patented Sept. 28, 1937

2,094,383

UNITED STATES PATENT OFFICE 2,094,383

AUTOMATIC CONTROL FOR POWER PROPELLED VEHICLES

Edwin G. Staude, Minneapolis, Minn.

Application March 11, 1932, Serial No. 598,222

33 Claims. (Cl. 192—.01)

This invention relates to improvements in fluid operable actuating mechanisms, for releasing clutches or setting brakes or for any other power requirement on power propelled vehicles, and includes improvements over the inventions of my patents, Reissue No. 15,906 and No. 1,785,052.

An important object of this invention is to provide a clutch mechanism for the fluid operable device which will be automatically operated to prevent the transmission of power to the circulating pump when fluid power is not required, thus avoiding unnecessary wear of the pump, but which, at the same time, is so constructed that when power is required, there is instant response by a pump driven at high velocity, to open the clutch and hold it open. In order to accomplish this object most satisfactorily, a controlling rod for the clutch for the fluid operable device is connected to the accelerator pedal of the automobile, and the "hook-up" is such that as the accelerator pedal closes the carburetor valve, a further movement of the accelerator pedal in the same direction will operate the pump clutch, to immediately start the pump gears and build up a pressure to disengage the main or motor vehicle clutch.

A further object of this invention is to provide a self-contained unit which can be quickly and easily installed, on any automobile at small cost, and without modification of the existing automobile structure.

A further object is to provide an oscillating vane or radial element against which fluid pressure acts to apply power to a rock-shaft, thus providing a structure which can be easily packed against leakage, and through which transfer of power can be had by means of a radial arm attached at the outside of the casing of the unit.

In my application Serial Number 375,846 for Fluid power controlling mechanism, there is shown a device of the so-called "pull through" type. This type involves the packing requirements of a piston rod. The rod extends outside of the case and even though the extending part is covered by a rubber boot, dust and dirt accumulates and is a detriment. For this reason, the oscillating type of power transmitter of the present invention, is quite superior, besides making for compactness, reduction in the size for a device of the same power capacity.

A further object is to provide for replenishing the pump fluid, usually oil, by a pipe which connects the low pressure side of the fluid circulating system of the pump with some point in the low pressure side of the fluid circulating system of the gasoline motor of the motor vehicle, this connection being preferably made at the discharge side of the oil filter. This connection also serves as a "breather pipe" to allow surplus fluid, due to expansion, to escape into the gasoline motor circuit, and as a connection through which oil flows by gravity into the pump circuit as required, thereby insuring a sufficient fluid supply for the pump at all times without any attention, and dispensing with the use of a reservoir which must be filled from time to time.

Another object is to operate small pump gears at high velocity, by means of the transmission shaft of the automobile.

In my application Serial Number 375,846 for Fluid power controlling mechanism, high gear speed is obtained by a small electric motor, but in the present case, this is accomplished by a worm drive connection to the transmission shaft, in which the worm gear ratio is such as to make pump gear speed three times that of the speed of the transmission shaft.

I have further found that by operating the small gears at a speed of about 20,000 revolutions per minute, an unusual advantage is obtained not only in reduction of size, but the teeth can be made to have such small pitch, that together with the high speed, gear tooth impulses are so nearly continuous that pressures up to 500 pounds or more per square inch may be obtained substantially without noise; whereas, in a pump of larger necessary tooth area operating at lower speed, the vibration at 500 pounds pressure is so pronounced that it requires careful mounting on heavy bases in an attempt to eliminate noise and vibration.

Features of the invention include all details of construction and arrangement, along with those broader ideas of means inherent in or suggested by the disclosure.

Objects, features and advantages of the invention will appear in the description of the drawings forming a part of this application, and in said drawings Figure 1 is a diagrammatic side elevation showing the application of my invention to a conventional type of automobile clutch, with the clutch held open by fluid power;

Figure 2 is a vertical section of the power unit;

Figure 3 is a horizontal section of the power unit;

Figure 4 is a vertical cross-section on line 4—4 of Figure 2;

Figure 5 is a view similar to Figure 4, except that the radial abutment or vane is shown in an advanced position;

Figure 6 is a detail section on line 6—6 of Figure 2, with parts positioned as in Figure 4;

Figure 7 is a vertical transverse section on line 7—7 of Figure 2, illustrating the clutch;

Figure 8 is a cross-section on line 8—8 of Figure 2, illustrating the pump gears and associated fluid circulating passages;

Figure 9 is a detail section on line 9—9 of Figure 8, further illustrating the pump; and Figure 10 is a detail section taken on line 10—10 of Figure 2, illustrating the valve for regulating the rate of discharge of the fluid.

In the drawings, see Figures 2 and 3, numeral 2 represents a casing which houses and supports the parts of the power unit. The casing 2 is bolted to the conventional type of transmission case by the usual flange 3 by means of suitable bolts 4. A sleeve type worm wheel 5 is mounted on the transmission shaft 6 and meshes with the worm 7, see Figure 2, journaled in removable bearings 8 and 9 and having a driving extension 10. The bearing 9 has a tubular extension as a part of the fluid circuit, and defining a clutch chamber. This extension fits a bore which extends the full length of the case 2, and in this same bore are successively assembled in axial alignment, other elements of the unit. Mounted in the bore in axial alignment with the drive shaft 10 is a pump block 12 of an intermittently operable fluid pump, having drive gear 11, suitably journaled therein as by shaft 15. The pump block has an inlet passage 13, and an outlet or pressure passage 14.

The pump gear shaft is axially aligned with the extension 10 of the worm 7, and a coil spring 16 of slightly smaller inside diameter than the diameter of the shafts 10 and 15, is adapted to seize the shaft by a built-up wrapping action to obtain a rigid driving connection. In order to overcome the clutching action of the spring 16 when it is unnecessary to drive the pump gear 11, there is provided a disc 17, see Figure 7, having ratchet shoulders 18, adapted to be engaged by a pawl 19, pinned to shaft 20. The shaft 20, see Figures 1 and 2, has an arm 21 having a head 22 swiveled thereto through which head a rod 23 slides. The rod is connected at its opposite end as at 24 to the accelerator pedal 25. The depending arm 26 on the accelerator pedal 25, to which the connection 24 is made, has slidably connected thereto a rod 27 which extends forwardly and is connected to the carburetor valve 28.

To obtain the exact operative adjustment between the valve 28 and clutch shaft 20, a pair of adjustable nuts 29 are provided on the rod 27. The position of these nuts determines the degree of motion which the accelerator pedal will have before the carburetor valve 28 is opened. During the first part of forward motion of pedal 25, the pawl 19 is moved into contact with a shoulder 18 of the disc 17 to release clutch 16 and stop rotation of the pump shaft. Further depression of the pedal 25 merely results in compression of the spring 30. A spring 31 acting on rod 23 yieldably holds the accelerator pedal in its upward or outward position. The "hook-up" is such that the carburetor valve 28 will be entirely closed before the pump gear 11 rotates as a result of clutching action initiated by release of the disc 17, resultant from withdrawal of pawl 19.

The clutch for the automobile is fluid-pressure controlled as follows: When fluid pressure is generated, the fluid flows through the passage 14, see Figure 4, and opens ball check valve 32 (either held seated under spring tension or by gravity) and the fluid flows against the vane 33, pivoted on rock-shaft 34, moving the vane to the dotted position 35, see also full line position in Figure 5. When the vane reaches this position, it uncovers the port 36 to allow escape of fluid, and so reduce the pressure that the vane 35 will not rotate any further than is necessary to equalize the load on the shaft 34, to which clutch-rod operating arm 42 is attached, see Figure 1. The clutch is now held open. As the fluid flows into the passage 36, it passes around the lateral edge of the vane 35 and enters the chamber 37 at the point 38 and flows back into the return passage 13, thus completing the pump circuit. The shaft 34, see Figure 2, has bearings 39 and 40 and is packed against capillary attraction and gravity at 41. Arm 42 is mounted on the outer end of the shaft 40 by a suitable key and clamp construction, and is connected to the clutch operating lever 43 by a rod 44.

From the above description, it is clear that immediately on rotation of the pump gears 11, pressure circulation is established in the passage 14, the pressure acting against the vane 33, causing shaft 34 to rotate and in turn move the arm 42, which pulls on the rod 44 and disengages the clutch mechanism through the movement of the clutch arm 43.

This device in no way interferes with ordinary clutch pedal control. The usual pedal 45 is mounted on the rock-shaft 46, see Figure 1, which is of conventional design. A forked depending arm 45' of the pedal straddles the rod 44 and bears against the adjustable nuts 46'. The clutch pedal 45 is, therefore, connected so that the automatic device may operate without moving the pedal 45. This is a feature.

In order to automatically control the return or clutching movement of the automobile clutch when the pump gears stop, there is provided a separate adjustable controlling valve. On the shaft 20 is a valve member or head 47, see Figures 2, 4, and 6. This valve has a series of passages 48, 49, and 50, two of which connect with corresponding passages of a block which divides the chamber 37 as shown, and which is held in position by suitable dowels and by the cover for the chamber. The passage 48 connects with passages 53 and 54 leading to the low pressure side of chamber 37 and thence to return passage 13. Passage 50 leads to passages 51—52, leading to the high pressure side of the chamber 37. When the arm 21 is in the position shown in Figure 4, the passages of the valve member 47 are so positioned that free communication from the pressure side of vane 33 to the opposite side of the vane is obtained and pressure is relieved and the vane immediately returns from the dotted to the full line position shown under action of the automobile clutch spring (not shown). Such substantially immediate return would take place, but it is desirable to let the clutch in slowly, just as an operator would do. To this end the speed of exit of the vane-driven fluid is controlled.

To this end, a valve 56, see Figures 2, 4, and 10, controls passage 52. The valve 56 is suitably packed as at 57, is operated by a knurled button 58, and is prevented from moving too freely by friction spring 59. By the proper adjustment of the valve 56, the return flow of the fluid through the passage 52 can be positively regulated, because no fluid may return through the passage 14 and seep by the pump gears because of the check valve 32. This is a valuable feature.

In Figure 8 is shown a cross-section of pump gear arrangement in which the drive gear 11 operates two idler gears 60 and 61. This is a feature of the invention, and by its use, two separate fluid circuits can be generated and controlled, one to operate a clutch mechanism and the other to operate a brake mechanism, or both fluid circuits may connect with one passage as herein shown, thereby obtaining a reduction of the size of the pump gears by one-half. The pump shown in Figure 8 has intake passages 62 and 63, and exhaust passages 64 and 65 connected by a passage 66.

The chamber 37 is filled by a suitable circulating fluid through the filler cap 55. After the chamber 37 has been filled with fluid, the filler cap or pipe fitting 55 is connected to the gasoline motor lubricating circuit by a suitable pipe 55'. This pipe 55' is preferably connected to the low pressure side of the usual oil filter 56'. By this means, should this fluid become slightly warm and give off a gas, this gas can escape through the pipe 55', to be dissipated in the gasoline motor lubricating circuit. By use of pipe 55', making connection between the gasoline motor lubricating circuit and the chamber 37, the chamber 37 is always kept filled, and for this reason no attention need be paid to replenishment, once filling has been accomplished.

The pressure pump fluid circulation is as follows, see Figures 2 and 4: The fluid enters the passage 13, which connects with the clutch chamber (with which chamber the intake ports of the pump communicate) and passes out through the passage 14 into the pressure space, see Figure 4, past the valve and against the vane 33. As the pressure builds up, it moves the vane to the position shown in dotted lines in Figure 4, after which the fluid by-passes around the edge of the vane into the port 36 and is again delivered into the chamber 37 at the point 38. The vane now remains in this position to hold the clutch out until the pump is stopped by depression of the accelerator pedal. When the pump stops and as the vane 33 moves in a reverse direction, it moves away from the port 36. It is now extremely desirable to control the rate of return of the vane 33 so that the motor car clutch may not be engaged too abruptly. For this purpose, the valve 56, having been adjusted, and the valve 47 being in the position shown in Figure 4, the fluid exhausts through the passage 52, 51, 50, 49, 48, 53, and 54, which again delivers to the low pressure side.

Although in Figure 7 I have shown a disc 17 provided with stops 18 against which the pawl 19 acts to stop the rotation of the spring clutch member 16 and expand the spring sufficiently to cause the shaft 10 to revolve freely without driving the pump gear 11, yet I wish it understood that I do not intend to limit the broader features of the invention by the precise construction shown. Other clutch means can be used and controlled for accomplishing the broader functions of the invention. I, therefore, wish to cover by claims any device which shall prevent the continuous flow of fluid when the power is not required. I further wish it to be distinctly understood that the device is suitable for clutch controls, brake controls or any other control for which it may be adapted, and that it is not to be limited to the specific use shown in the drawings.

In order to obtain the instant action necessary for operating either a clutch or a brake or both, it is necessary to have a sufficient fluid volume and pressure so that the auxiliary power will follow up somewhat faster than foot pedal action (where the operation is manual) and in order to do this, there must be sufficient volume so that when the car is operating at low speeds, the power will not lag. This means that when the car is traveling at a speed of fifty miles per hour, the circulation will be unnecessarily increased to as much as a gallon and one-half of fluid per minute. It is to prevent this unnecessary circulation when not required that I have invented this pump cut-out mechanism.

While I have shown the power take-off for my automatic vehicle control from the automobile propeller shaft, the power may be taken from any part which is engine-driven.

In order that my pump clutch may be fully automatic, it is extremely important that it be operated or controlled from the accelerator pedal, so that the power will be automatically applied to the automobile controls directly that the engine throttle is closed, and so that the accelerator pedal, which controls the engine throttle, is allowed to move a sufficient distance past the closing point to operate the pump clutch.

I claim as my invention:

1. A control for power propelled vehicles comprising a motor vehicle clutch, a fluid pressure pump, and means for driving it, a pedal-controlled clutch interposed between the pump and pump driving means, and means against which the fluid pressure acts for operating the motor vehicle clutch.

2. A control for power propelled vehicles comprising a motor vehicle clutch, a fluid pressure pump and means for driving it, an accelerator-pedal-controlled clutch interposed between the pump and the pump driving means, and means against which the fluid pressure acts for operating the motor vehicle clutch.

3. A control for power propelled vehicles comprising a motor vehicle clutch, a fluid pressure pump and means by which it is driven from the vehicle driving means, an accelerator-pedal-controlled clutch interposed between the pump and the driving means, and means against which the fluid pressure acts for operating the motor vehicle clutch.

4. A control for motor propelled vehicles comprising a fluid pressure pump and means for driving it, an accelerator-pedal-controlled means interposed between the pump and the pump driving means, means for controlling the fluid pressure, and means against which the fluid pressure acts for operating a motor vehicle control.

5. A control for motor propelled vehicles comprising a fluid pressure pump and means for driving it, pedal-controlled means interposed between the pump and the driving means, valve means for controlling the fluid pressure, and oscillating means against which the fluid pressure acts for operating a part of the motor power controlling means.

6. A control for motor propelled vehicles comprising a fluid pressure pump, and means for driving it, an accelerator-pedal-controlled coil spring clutch interposed between the pump and the pump driving means, valve means for controlling the fluid pressure, and an oscillating vane against which the fluid pressure acts, an exhaust port for limiting the maximum movement of the vane, and means by which the vane controls a part of the motor vehicle power controlling means.

7. A control for motor propelled vehicles comprising a fluid pressure pump and means for driving it, an accelerator-pedal-controlled clutch interposed between the pump and the pump driving means, means against which the fluid pressure acts for operating a part of the motor vehicle power controlling means, and an exhaust port for limiting the movement of said operating means.

8. A control for motor propelled vehicles comprising a vehicle clutch, a fluid pressure pump and means for driving it, an accelerator-pedal-controlled means between the pump and the pump driving means, a check valve on the exhaust side of said fluid pressure pump, an oscillating vane against which the fluid pressure acts from the exhaust side of said fluid pressure pump, exhaust ports for limiting the maximum movement of said oscillating vane, and means by which the vane operates the vehicle clutch.

9. A control for motor propelled vehicles comprising a vehicle clutch, a fluid pressure pump and means for driving it, a pedal-controlled clutch interposed between the pump and the pump driving means, valve means for controlling the fluid pressure, an oscillating vane against which the pressure acts, and means by which the vane operates the motor vehicle clutch.

10. A control for motor propelled vehicles comprising a source of fluid power, means for controlling said fluid power, an oscillating vane against which said fluid power acts, an exhaust port for limiting the movement of said vane, and connections between said vane and a motor vehicle control.

11. A control for motor propelled vehicles comprising a source of fluid power, means for controlling said fluid power, an oscillating vane against which said fluid power acts, a rock-shaft of which said vane is a part for transmitting power to a motor vehicle control, and pipe connections with the motor vehicle lubricating circuit for replenishing the fluid.

12. A control for motor propelled vehicles comprising a fluid pressure pump having a fluid circuit, an accelerator pedal and means by which it stops the pump upon initial depression, means in said fluid circuit and against which said fluid pressure acts, a rock-shaft controlled by said last mentioned means, and connections between the rock-shaft and a motor vehicle control.

13. A control for motor propelled vehicles comprising a motor lubricating system including an oil filter, a fluid pressure pump, means for controlling said fluid, means against which the fluid acts to transmit power to a motor vehicle control, and pipe connections between the low pressure side of the oil filter of the motor lubricating system and the fluid circuit.

14. In combination with an automobile having an engine throttle and pedal therefor, a clutch pedal, a clutch having the usual spring against the action of which the clutch is opened, a fluid-operable device and power means therefor, said fluid-operable device including a fluid circuit, a rock-shaft having a radial abutment upon which the fluid acts, a check valve in the fluid circuit opening toward the abutment, a valve for by-passing fluid around said valve to allow reverse motion of the abutment, a clutch controlling power transmission for the fluid-operable device, means for operatively connecting the rock-shaft with the automobile clutch including a rod having an abutment engageable by the clutch pedal to independently control the fluid power clutch, means by which the throttle pedal during the forepart of its forward motion disconnects the fluid power controlling clutch and moves the by-pass valve to by-passing position, and on reversing motion correspondingly reverses the position of the fluid power clutch and by-pass valve, and a connection between the accelerator pedal and the accelerator which causes the throttle valve to remain closed until the pump clutch is disconnected, and causes said throttle valve to open after the automobile clutch is connected.

15. In combination with an automobile having an engine throttle and pedal therefor and a clutch, a fluid operable device and power means therefor, said device having movable means against which the fluid acts, a valve for by-passing fluid to allow reversing motion of said movable means, a clutch controlling power transmission to the fluid operable device, means by which the fluid-movable means controls the automobile clutch to open it when fluid power is applied, and means by which advance motion of the throttle pedal disconnects the fluid power clutch and moves the by-pass valve to by-passing position, and vice versa.

16. In combination with an automobile having an engine throttle and pedal therefor and a clutch, a fluid operable device and power means therefor, said device having movable means against which the fluid acts, a valve for by-passing fluid to allow regulated reversing motion of said movable means, a clutch controlling power transmission to the fluid operable device, means by which the fluid-movable means controls the automobile clutch to open it when fluid power is applied, and means by which advance motion of the throttle pedal disconnects the fluid power clutch and moves the by-pass valve to by-passing position, and vice versa.

17. In combination with an automobile having an engine throttle and pedal therefor and a clutch, a fluid operable device and power means therefor, said device having movable means against which the fluid acts, a check valve in the fluid circuit opening toward the last mentioned means, a valve for by-passing fluid around said check valve to allow regulated reversing motion of said movable means, a clutch controlling power transmission to the fluid operable device, means by which the fluid-movable means controls the automobile clutch to open it when fluid power is applied, and means by which advance motion of the throttle pedal simultaneously disconnects the fluid power clutch and moves the by-pass valve to by-passing position, and vice versa.

18. A fluid operable device and power means therefor, means for controlling the device including power transmitting means against which the fluid acts, a power clutch, a by-pass valve which permits reversing action of the power transmitting means by application of extraneous power thereto, and means by which the power clutch and by-pass valve are simultaneously operated to engage the clutch and move the valve to prevent by-passing, and vice versa.

19. In combination with an automobile having an engine throttle and pedal therefor, a clutch having the usual spring against the action of which the clutch is opened, a fluid operable device and power means therefor, said fluid operable device including a fluid circuit, and having a radial abutment upon which the fluid acts, a valve for by-passing fluid to allow reverse motion of the abutment, a clutch controlling power transmission of the fluid operable device, means for operatively connecting the abutment with the automobile clutch, and means by which the throttle pedal when moving in one direction disconnects the fluid power clutch and moves the by-pass valve to by-passing position, and on reversing motion correspondingly reverses the positions of the fluid power clutch and by-pass valve.

20. In combination with an automobile having an engine throttle and a pedal therefor and a clutch having the usual closing spring, a fluid operable device, means by which the device controls the clutch to open it when fluid pressure is applied, means operable by the pedal for controlling the device including a power clutch, and a by-pass valve which permits reversing action of said fluid operable device by the spring of the automobile clutch, the operation of said pedal in acceleration direction acting to open the power clutch and the by-pass, and vice versa.

21. A clutch control for power propelled vehicles, including a vehicle clutch, a cylinder having a piston connected for disengaging the clutch, a pedal-controlled throttle valve for controlling fluid power in the cylinder, said cylinder having an exhaust port arranged at a point which determines the maximum stroke of the piston.

22. A clutch control for power propelled vehicles comprising a motor vehicle having a clutch, a source of fluid power, a cylinder having a piston for controlling the clutch, a pedal-controlled throttle valve for controlling the fluid power in the cylinder, said cylinder having an exhaust port at a point which determines the maximum stroke of said piston, and adjustable means for independently determining the speed and time of exhaust upon return of said piston in a direction to allow clutch engagement.

23. In combination with an automobile having an engine, and throttle therefor, means for controlling the throttle, a driven shaft, a pump, a clutch by which the shaft can drive the pump, and means operable by the throttle control means for operating the clutch to obtain pump operation.

24. In combination with an automobile having an engine, a driven shaft, a fluid pressure operable pump, a clutch by which the shaft can drive the pump, and plural means including a single control member operable by the driver of the automobile for controlling the fluid supply to the pump and controlling the clutch respectively to connect the clutch for pump operation and admit fluid for pumping.

25. In combination with an automobile, a throttle and control pedal therefor, and a clutch, a driven shaft, a pump, and means by which it controls the clutch, a clutch by which the shaft can drive the pump, and means operable by the throttle pedal for controlling the pump clutch to obtain pump operation.

26. In combination with an automobile having an engine, a throttle valve, a pedal for operating the throttle valve, a clutch, a pump and means by which it operates the vehicle clutch, and means operable as the result of continued motion of the accelerator pedal in the same direction, after or during the closure of the throttle valve, to immediately start the pump and build up pressure to disengage the motor vehicle clutch.

27. In combination with an automobile having an engine, a throttle valve, a pedal for operating the throttle valve, a clutch, a pump and means by which it operates the vehicle clutch and means operable as the result of continued motion of the accelerator pedal in the same direction after or during the closure of the throttle valve to immediately start the pump and build up pressure to disengage the motor vehicle clutch, said means including a pump which is driven as the result of operation of the engine, and a clutch by which the pump driving connection is established as the result of motion of the accelerator pedal, to build up the pressure in the manner aforesaid.

28. A clutch control for power propelled vehicles including a vehicle clutch, power means, and controlling means connecting said power means with the clutch, an engine throttle pedal and means including a clutch by which the throttle pedal controls the power means, a vehicle clutch pedal and means by which the clutch pedal can independently control the vehicle clutch to open the vehicle clutch by engagement with part of said controlling means, said vehicle clutch pedal being normally positioned to permit operation of the vehicle clutch independently of the vehicle clutch pedal.

29. A fluid pressure power mechanism for motor vehicle controls in combination with the engine throttle pedal, including a pump for generating fluid pressure, a drive for said pump, means for automatically connecting said drive to said pump, said means comprising a control member operable by said throttle pedal, the initial depression of said throttle pedal being adapted to disconnect the power from said pump and continued depression in the same direction to speed the engine.

30. In combination with an automobile having an engine accelerator and control means therefor, and a device to be controlled, which device has a spring moving a part of it to a certain position from which it is to be power-moved, a fluid pressure system including means for creating fluid pressure therein, power transmitting means against which fluid under pressure acts, a passage through which fluid flows to annul its power applying action on said power transmitting means, means for regulating the rate of flow through said passage, means controlled by the accelerator control means to start the fluid pressure means during motion of the accelerator control means in throttle-closed direction and for stopping action of said fluid pressure creating means during motion of said accelerator control means in throttle-open direction, and a connection between said power transmitting means and said device to be controlled such that the spring provides power for moving said power transmitting means to exhaust the fluid through said passage after the pressure creating means is inoperative.

31. In combination with an automobile having an engine, a control and an engine throttle, power means and means interposed between the power means and a mechanical drive therefor, and means by which said power means actuates said control to throw the latter out of active control of the automobile and maintain the latter out of active control of the automobile while the power means is in motion and make it possible to place the control in active control of the automobile when the power means ceases to move, and means controlling said interposed means for in turn trolling the motion of said power means including means automatically applying force to start the motion of the power means and including means pressure-operable to control said last mentioned means to stop the motion of the power means and to operate the throttle to obtain engine acceleration, and acting to interrupt the action of said force-applying means on said power means.

32. In combination with an automobile having an engine, a clutch and an engine throttle, power means and means interposed between the power means and a mechanical drive therefor, and means by which it is possible for said power means to control the clutch to open the clutch and keep the clutch open while the power means is in motion and to close the clutch when the power means ceases to move, and means controlling said interposed means for in turn controlling the motion of said power means, including means automatically applying force to start the motion of the power means, and including means pressure-operable to control the last mentioned means to stop the motion of the power means, and operate the throttle to obtain engine acceleration, and acting to interrupt the action of said force-applying means on said power means.

33. A control for power propelled vehicles comprising a motor vehicle control, a rotary liquid pressure pump, and means for driving it, a pedal-controlled clutch interposed between the pump and pump driving means, and means against which the liquid pressure acts for operating the motor vehicle control.

EDWIN G. STAUDE.